United States Patent [19]

Greenaway

[11] 4,184,700

[45] Jan. 22, 1980

[54] DOCUMENTS EMBOSSED WITH OPTICAL MARKINGS REPRESENTING GENUINENESS INFORMATION

[75] Inventor: David L. Greenaway, Oberwil, Switzerland

[73] Assignee: LGZ Landis & Gyr Zug AG, Zug, Switzerland

[21] Appl. No.: 938,922

[22] Filed: Sep. 1, 1978

Related U.S. Application Data

[63] Continuation of Ser. No. 737,431, Nov. 1, 1976, abandoned.

[30] Foreign Application Priority Data

Nov. 17, 1975 [CH] Switzerland ............... 14846/75

[51] Int. Cl.² .................. B32B 3/30; B42D 15/00
[52] U.S. Cl. ................................ 283/6; 283/7; 283/11; 283/17
[58] Field of Search .............. 283/6, 7, 8 R, 9 R, 283/11, 17; 101/31

[56] References Cited

U.S. PATENT DOCUMENTS

| | | | |
|---|---|---|---|
| 3,055,117 | 9/1962 | Bernstein | 283/6 |
| 3,412,493 | 11/1968 | French | 283/8 |
| 3,465,627 | 9/1969 | Vigneault | 83/613 |
| 3,497,576 | 2/1970 | Dvorin | 264/1 |
| 3,643,216 | 2/1972 | Greenaway | 340/146.3 P |
| 3,814,904 | 6/1974 | Russell et al. | 235/61.11 E |
| 3,887,742 | 6/1975 | Reinnagel | 283/8 |
| 4,011,435 | 3/1977 | Phelps et al. | 235/454 |
| 4,020,278 | 4/1977 | Carre et al. | 358/128 |

*Primary Examiner*—John McQuade
*Attorney, Agent, or Firm*—Morgan, Finnegan, Pine, Foley & Lee

[57] ABSTRACT

There is disclosed a document comprising a flat support member of non-thermoplastic material at least partly coated with a thermoplastic coating, in which coating are embossed optical markings having a light-modifying relief structure, said markings representing information indicating the genuineness or identity of the document. There is also disclosed a process for producing such a document, and an embossing die for use in such a process.

7 Claims, 6 Drawing Figures

DOCUMENTS EMBOSSED WITH OPTICAL MARKINGS REPRESENTING GENUINENESS INFORMATION

This is a continuation of application Ser. No. 737,431 filed Nov. 1, 1976, now abandoned.

BACKGROUND AND BRIEF DESCRIPTION OF THE INVENTION

This invention relates to documents.

Documents such as bank-notes, securities, identity cards, credentials, tickets and the like have become an indispensable aid to everyday life. The monetary or legal value of such documents is often considerable, which induces the criminal elements of society to forge, change or copy such documents.

In the industrialized countries, machines are increasingly being used to check the genuineness or identity of documents. Examples of such machines are bank-note checking and changing machines and devices for accepting travel or admission tickets. If the genuineness or identity features of documents to be checked by machine are too simple, this again forms a strong inducement to fraudulent action.

One of the safest known methods to prevent a document from being forged is to store the information indicating genuineness thereon in the form of diffraction gratings or holograms. Such diffraction gratings and holograms can be read and checked for their genuineness relatively easily by a machine. However, their production requires the use of rare, costly technical aids and considerable expert knowledge, so that any forgeries thereof which could possibly be successful can only result from large expenditure.

For the mass production of holograms, it is known to emboss them in a thermoplastic material support by means of an embossing die. The use of this duplication method has already been proposed for producing card-type means of payment, wherein holograms or diffraction gratings are embossed in a plastic support member.

Furthermore, an identity card is known which is protected against forgery by stamping a refracting pattern into a plastic support member.

However, it has not hitherto proved possible to use the hologram or diffraction grating duplication method by embossing with support members made from paper, cardboard or like materials.

The problem of the invention is therefore to provide a document of the type indicated hereinbefore which can be produced by using the known embossing method, although its support member is made from a material which, due to its fibrous, granular or cellular structure or due to its thermal characteristics is unsuitable for the application of the embossing method per se.

According to the present invention there is provided a document comprising a flat support member of non-thermoplastic material at least partly coated with a thermoplastic coating in which are embossed optical markings with a light-modifying relief structure, representing information indicating the genuineness of the document.

BRIEF DESCRIPTION OF THE DRAWINGS

The invention will now be described by way of example with reference to the accompanying drawing, in which.

DETAILED DESCRIPTION OF THE INVENTION

Figure 1:
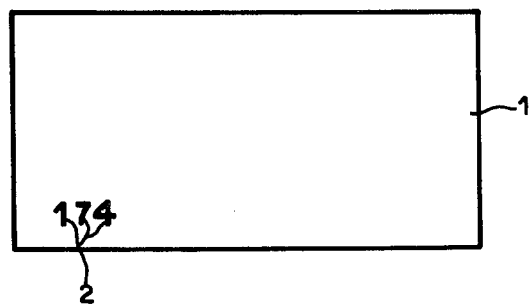
FIG. 1 shows a plan view of a document.

FIG. 1 shows the flat support member 1 of a document, which is preferably a bank-note or security, an identity card or credential, such as an admission or travel ticket. The support member 1 comprises a nonthermoplastic material, preferably paper or cardboard, which due to its surface characteristics or thermal properties is not suitable per se to receive information in the form of a very fine light-modifying relief structure produced by an embossing process.

The support member 1 is at least partly coated with a thermoplastic layer or coating 2. In the example of FIG. 1, this coating 2 comprises a thermoplastic printing ink which is printed on the support member 1 and represents numerical or alpha-numerical characters. Through an adequate application of ink, it is ensured that the thermoplastic printing ink is not completely absorbed by the surface of the support member 1, so that after drying the printing ink, a smooth coating 2 is formed in the printed areas, which covers the fibrous, granular or cellular structure of the support member 1. The thermoplastic printing ink has a temperature characteristic such that the coating 2 can be plastically deformed by applying pressure and heat, without thereby damaging the support member 1. The remaining open areas of the document in FIG. 1 can be printed in conventional manner with characters, ornamentation, pictorial representation and the like.

Optical markings with a light-modifying relief structure are embossed on the coating 2. The relief structure is such that it brings about a modification of the beam path of a reading light beam on reading the information indicating genuineness, represented by the relief structure, in an optical reading device.

Figure 2:
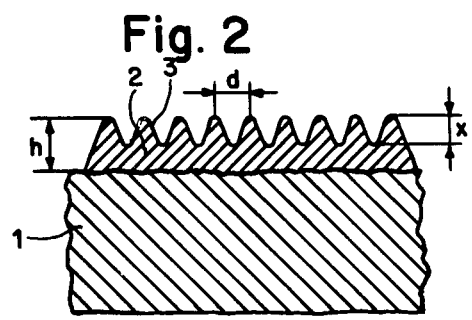
FIGS. 2 and 3 are large scale sectional representations of respective documents.

FIG. 2 shows a cross-section of the support member 1 and the coating 2. The optical markings 3 embossed on the coating 2 in this case form a light diffracting element having microscopically fine details and which modifies light projected onto the relief structure by light diffraction. It is also easily possible to emboss optical markings 3, whose details are of the same order of magnitude as the wave-length of visible light. The light diffracting element can preferably be a single-phase diffraction grating with a characteristic periodicity and characteristic line profile. A hologram is also advantageous, which deflects incident radiation with a given wave-length into one or more predetermined directions.

The information indicating genuineness contained in the light diffracting element can be read in suitable reading devices by means of light sources and light sensors. Such reading devices are known and will not therefore be described here. The reading of the information indicating genuineness preferably takes place by means of the radiation reflected by the optical markings 3. If the support member 1 also causes a slight dispersion and absorption of the incident radiation, it is also possible to scan the transmitted radiation.

The presence of the optical markings 3 on the document can also be easily visually checked. Particularly in the case of a light diffracting element with a diffraction grating, the genuineness of the document can be checked without any auxiliary means by means of the color spectrum into which incident daylight or white artificial light is split.

The optical markings 3 forming a light diffracting element have a typical line spacing d of approximately 2 microns, but it is also possible to have a larger or smaller line spacing in the range 0.5 to 10 microns. The typical profile depth x of the relief structure is smaller than 1 micron and the typical thickness h of the coating 2 is a multiple of x, preferably a small multiple.

Figure 3:
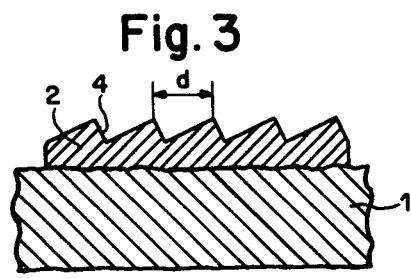

Besides such fine structures, it is also possible to emboss optical markings with a coarser relief structure on the coating 2, which substantially modifies the incident light by reflection or optical refraction on the basis of the laws of geometrical optics, instead of by diffraction. Optical markings 4 of this type embossed on coating 2 are shown in FIG. 3. It must be noted that FIG. 3 is not to the same scale as FIG. 2. In this case, the line spacing d is 10 to 100 microns. In the example of FIG. 3, the optical markings 4 represent a facet profile with a sawtooth cross-section, which reflects the incident light in a clearly defined manner.

Figure 4:
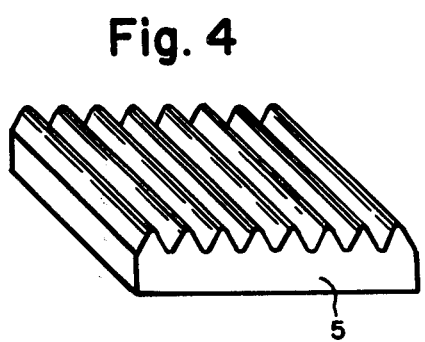
FIGS. 4 and 5 show on a large scale portions of respective embossing dies.
Figure 5:
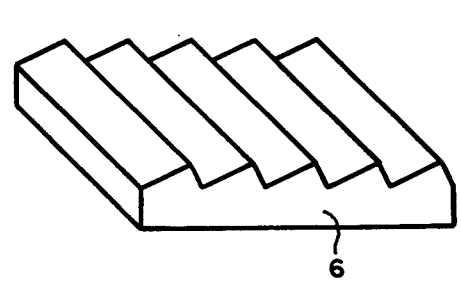

The embossing of optical markings 3 or 4 takes place with an embossing die, through the application of pressure and heat. FIG. 4 shows a portion of a metal embossing die 5 in which a master diffraction grating or a master hologram is produced by etching or the like for forming the optical markings 3. FIG. 5 shows a portion of an embossing die 6 which is suitable for embossing the optical markings 4. The embossing dies 5 and 6 can either be constructed as a block or as an endless embossing belt.

If the embossing dies 5 or 6 also engage areas of the documents which are not coated with the coating 2, these areas may possibly also be deformed. However, as opposed to the coated areas, the uncoated embossed areas cause a considerable dispersion of the incident radiation, without modifying it in characteristic manner.

The storage of information indicating genuineness in the form of embossed optical markings on the thermoplastic coating 2 can be utilized for the formation of printed numerical or alpha-numerical characters, which can be read by a machine, if different relief structures or different orientations of a relief structure are associated with different characters. In other words, information is printed in numerical or alpha-numerical form on the support member 1, and the same information is contained in the optical markings 3 or 4 in coded form. It is thus possible in simple manner to read from the printed document, for example, the name of a person or an account number in the reading device.

Figure 6:
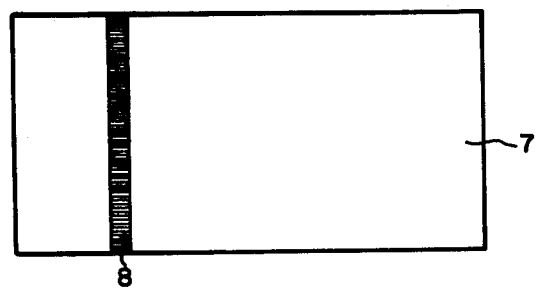
FIG. 6 shows a further document.

FIG. 6 shows the support member 7 of a document printed in conventional manner. Printed and/or unprinted areas of the support member 7 are subsequently coated with a thermoplastic, transparent coating 8, which in the represented example, has the form of a narrow strip, similar to a security thread in a bank-note. Coating 8 can cover the entire area of the document. It can be applied to the printed support member 7 by known printing or coating methods. Optical markings 3 or 4 (FIGS. 2 and 3) with a light-modifying relief structure are once again embossed on coating 8.

Coded information can also be fed into the document through the optical markings 3 or 4 only being embossed on selected areas of the coating 2 or 8, whereby the location of the markings on the document represents the information.

In order to protect the optical markings 3 or 4 embossed on the coating 2 or 8 against mechanical wear and tear, perspiration and the like, they are preferably covered with a transparent protective coating. To maintain the diffraction effect of the fine relief structures, a protective coating can be selected having a different refractive index to the thermoplastic coating 2 or 8. Furthermore, a thin metallic reflection coating can be inserted between the two coatings. Such a reflection coating can be produced chemically or by vapordeposition and have a thickness of a few hundred angstroms. The optical markings 3 or 4 on the document can also be protected from damage by a simple transparent envelope.

I claim:

1. A document comprising a flat support member of paper or cardboard at least partly coated with a thermoplastic coating, in which coating are embossed optical markings having a relief structure with a line spacing in the range of 0.5 to 100 microns, said markings representing information indicating the genuineness of the document, said markings being machinereadable by means of the light diffraction or refraction caused by the relief structure, and further comprising a thin metallic coating covering said optical markings.

2. A document according to claim 1, further comprising a transparent protective coating covering said optical markings.

3. A document comprising a flat support member of paper or cardboard at least partly coated with a thermoplastic coating, in which coating are embossed optical markings having a relief structure with a line spacing in the range of 0.5 to 100 microns, said markings representing information indicating the genuineness of the document, said markings being machinereadable by means of the light diffraction or refraction caused by the relief structure, wherein said thermoplastic coating comprises thermoplastic ink printed on said support member in the form of numerical or alpha-numerical characters, the information represented by each of said characters being additionally represented in coded form by the relief structure of each respective character.

4. A document according to claim 3, further comprising a thin metallic reflection coating covering said optical markings.

5. A document according to claim 4, further comprising a transparent protective coating covering said optical markings.

6. A document comprising a flat support member of paper partly coated with a thermoplastic coating, in which coating are embossed optical markings having a relief structure with a line spacing in the range of 0.5 to 10 microns, said markings representing information indicating the genuineness of the document, said markings being machine-readable by means of the light diffraction caused by the relief structure, and further comprising a thin metallic reflection coating covering said optical markings.

7. A document according to claim 6, further comprising a transparent protective coating covering said optical markings.

* * * * *